Oct. 2, 1951     W. D. WHITNEY     2,569,593
CLUTCH HEAD
Filed March 1, 1948
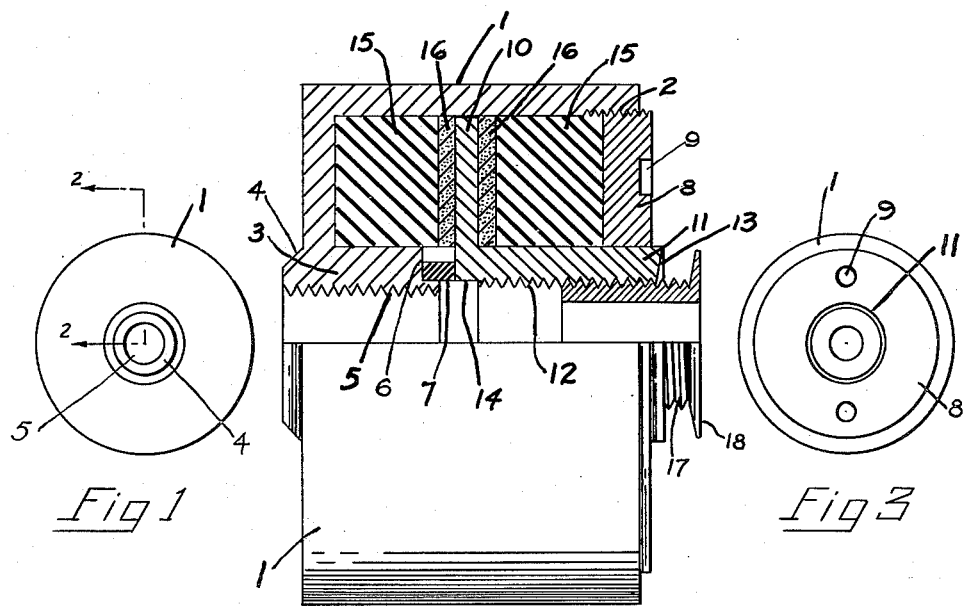
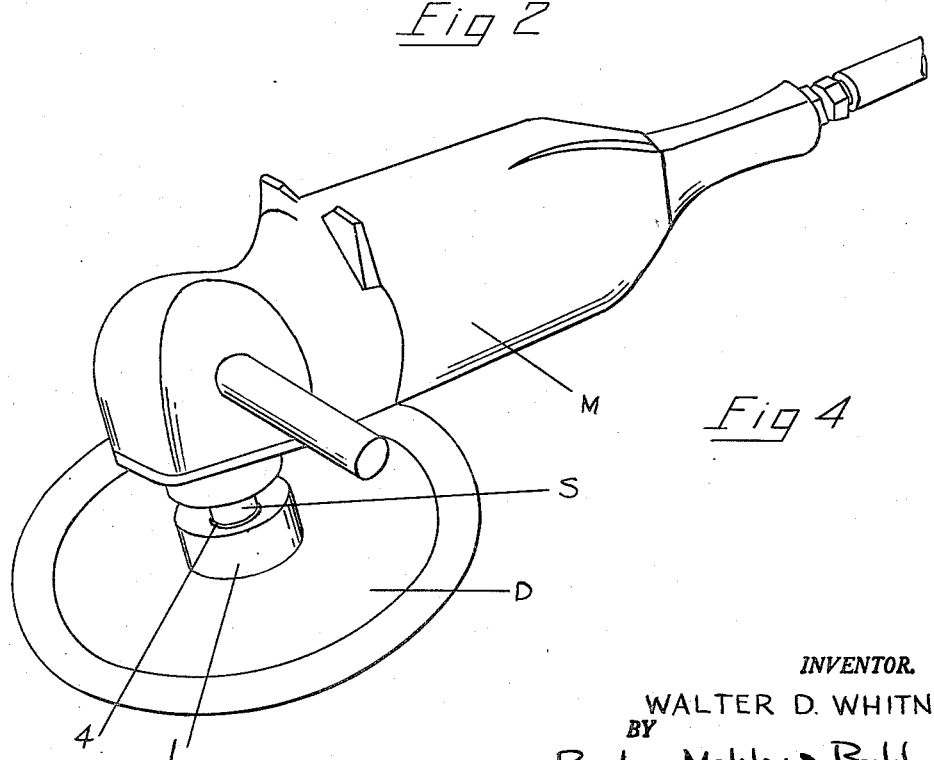
INVENTOR.
WALTER D. WHITNEY
BY
Boyken, Mohler & Beckley
ATTORNEYS Patented Oct. 2, 1951

2,569,593

UNITED STATES PATENT OFFICE 2,569,593

CLUTCH HEAD

Walter D. Whitney, San Francisco, Calif.

Application March 1, 1948, Serial No. 12,292

6 Claims. (Cl. 64—30)

This invention relates to a clutch head and more particularly to a clutch mechanism providing a safety mechanism which permits slipping when the unit is overloaded.

The present invention has been designed particularly to provide a clutch mechanism having a safety slippage construction for use on portable revolving tools which, when they become stuck or jammed are quite likely to vibrate and jump out of the hand of an operator, with possible serious injury to him. However, although the invention will find extensive application to such types of machines as sanders, drills, pulleys, hoists, etc., it will be seen, following the description, that it may be utilized in many other applications wherever a slipping clutch is needed.

In general, it comprises an exceedingly small, simple and inexpensive unit which may easily be attached to existing machinery. It is so arranged that so long as the resisting torque applied to the driven element remains below a predetermined value, the device will operate as though said element were being positively driven. If, however, the torque exceeds that value, the device will permit slippage so that the driven element is no longer rotated. Thus, if it is applied to a portable sander or drill and the sanding discs or the drill becomes jammed, for some reason, the sander or drill motor will continue to revolve even though the discs or drill remain stationary. This eliminates any possibility of loss of control of the machine and injury to the operator.

In addition to the features just described, the invention is provided with an adjusting means for choosing the amount of torque which may be applied to the driven element before slipping occurs.

Thus it is seen that one of the objects of the invention is a clutch mechanism which is simple and inexpensive and which is arranged to transmit a limited and predetermined value of torque before slipping.

Another object of the invention is a clutch mechanism having a means for adjusting the amount of transmitted torque prior to slipping.

A further object of the invention is a clutch mechanism designed to slip when the driven member becomes jammed to prevent injury to the operator.

Still another object of the invention is a clutch mechanism for use on rotary tools which is designed to slip when the tool becomes stuck or jammed.

In the drawings,

Fig. 1 is an elevation of the driving end of the preferred form of the invention.

Fig. 2 is a view, partially in section, along the line 2—2 of Fig. 1.

Fig. 3 is an elevation of the driven end of the device shown in Fig. 1.

Fig. 4 is a perspective view of the device shown in Fig. 1 used in conjunction with a sanding machine.

The particular form of the mechanism illustrated in the drawings and which will subsequently be described is the preferred form but it is to be clearly understood that other and desirable arrangements of the elements could be obtained without departing from the scope of the invention.

In general, the clutch comprises a driving and a driven member so arranged for frictional engagement that the driving member drives the driven member for only a certain range of torques as applied to the driven member. When the torque becomes too great, the clutch is specifically designed to slip and no further motion is imparted to the driven member. Means are also provided to adjust the point at which motion will no longer be imparted to the driven member, in order that, as the clutch may be interchanged, appropriate and safe values may be determined and chosen.

To best illustrate the invention, a form of clutch adapted to be used on a portable, power driven sander is shown in the drawings. This unit, for operation with a certain H. P. sander need be no larger than approximately 2½ inches in diameter and 1 inch thick.

As can be seen in detail in Fig. 3, the driving member comprises a circular cup shaped housing 1 formed of metal, having its outer and open end internally threaded, as at 2. Housing 1 is provided with an integrally formed, centrally positioned reinforcing flange 3, extending inwardly of the housing for approximately half the latter's depth and also slightly outwardly as at 4. The boss is drilled and threaded centrally, as at 5, in order to receive and engage the rotating shaft of the sander. The inner end of boss 4 is ground to provide an offset bearing seat 6 and this seat supports an oil seal 7 formed of rubber or the like.

The housing is closed at its open end by a circular adjusting plate 8 in the form of an annular ring and threaded on its circumferential edge to engage the internally threaded housing, as at 2. Plate 8 is also provided with two or more holes 9 adapted to receive a spanner wrench for tightening and adjusting the same, as will be described. The driven element comprises the clutch plate 10, positioned centrally of the housing, provided with an integrally formed boss 11. The diameter of the boss is the same as that of the central hole in the adjusting plate and the former is adapted to extend therethrough. The boss is centrally drilled and threaded, as at 12, and its outer end may be formed with a slight inwardly sloping bevel, as at 13, for a purpose to be described. The opposite side of the clutch plate is slightly counterbore, as at 14, to receive the terminating end portion of flange 3 on the housing when the two are moved into engagement against oil seal 7 a sufficient distance.

The friction members of the unit comprise a pair of pressure pads 15, formed of rubber or the like and preferably of a material unaffected by submergence in oil. The pressure pads are formed in the shape of annular rings and one is positioned in the housing 1 against its closed end and surrounding boss 3. The other is positioned at the opposite end of the housing next to the adjusting plate, as may be seen in Fig. 2. There is also provided a pair of friction discs 16, formed of cork or similar flexible material, positioned on either side of the drive plate 10. These friction discs are also formed in the shape of annular rings and each is held in frictional engagement with the clutch plate by the corresponding pressure pad 15.

The operation of the invention is obvious and may best be illustrated by resort to its application to the portable sanding machine M, as shown in Fig. 4. The internal threads, as at 5, on the housing are adapted to receive the threaded drive shaft S of the sander to secure the clutch head to the sander. The sanding discs D are attached to the clutch head at the opposite side by removing the retaining nut 17, positioning the same thereon and replacing the nut to hold them tightly in place.

Rotation of the sander's drive shaft will, of course, cause rotation of the housing 1. The pressure pads 15 and the friction discs 16, being elastic and flexible and secured tightly in the housing by the adjusting plate 8, will, in turn, be driven because of their frictional engagement with the housing. The friction plates 16 in turn will frictionally impart their motion to the clutch plate 10 to cause corresponding rotation of the sanding discs.

The remaining space within the housing is preferably filled with oil which acts as a cooling medium when there is relative motion between the clutch plate 10 and friction plates 16.

In the particular form of the invention shown, a retaining nut 17 is also provided to support the necessary sanding discs. The shank of this nut is externally threaded to engage the internally threaded boss 11 on the drive plate and is provided with a flange 18 at its outer end to bear against the sanding discs to hold the same in place against the beveled surface of the boss 11 on the drive plate.

If, during the use of the sander, the sanding discs should, for any reason, become stuck or jammed so that further rotation is impossible or might be dangerous, the additional torque applied to the sanding discs will be imparted to the clutch plate 10 and cause it to remain stationary while the friction plates continue to rotate relative thereto. While this is happening, the operator can either turn off the sander or remove the difficulty causing the additional torque, after which the friction between the clutch plate 10 and the friction plates 16 will again cause the former to rotate.

As can also be seen, the adjusting plate 8 provides a means for adjusting the clutch head in a manner that more or less torque will have to be applied to the sanding discs before slippage occurs. In the positions of the elements shown in Fig. 2, the plate 8 is arranged so that a relatively small amount of torque will cause slippage. If the plate 8 is screwed further into the housing, forcing the friction plates 16 and the pressure pads into tighter frictional engagement with the clutch plate 10 and the housing 1, it is seen that the torque applied to the sanding discs before slipping occurs will be considerably greater. The particular adjustment of plate 8 for any particular use may vary but this may be determined by the wishes and experience of the operator.

With respect to the application of the invention to the sander it is seen that where, without the use of the clutch head, the sudden application of large or binding torques to the sanding discs causes undesirable operation of the unit and may well cause it to jerk or jump out of the hands of the operator with possible serious injury to him. The use of the clutch head eliminates these possibilities and insures safe and proper operation whether or not the sanding discs become jammed or become subject to greater torques.

I claim:

1. A clutch head comprising: an open ended cylindrical housing; a clutch plate positioned within and substantially centrally of and for rotation with respect to said housing, said plate having a hub extending outwardly of said housing; a pair of friction discs positioned within said housing and on opposite sides of said plate and in frictional engagement therewith; a pair of pressure pads positioned within said housing, one of which is in frictional engagement with said one of said discs and the walls and closed end of said housing, and the other of which is in frictional engagement with the other of said discs and the walls of said housing, whereby rotation of said housing will cause rotation of said plate when the torque applied to said hub is below a predetermined value; one of the end walls of said housing comprising an adjustable closure plate provided with a centrally positioned hole through which said hub rotatably extends, said closure plate being in frictional engagement with said other pad for forcing said pads against the end of said housing opposite said closure plate and said discs against said plate.

2. A clutch head comprising a hollow cylindrical housing, a pair of heads respectively closing opposite ends of said housing and secured to the latter, means for adjustably securing one head of said pair to said housing for movement thereof to different distances from the other head, a clutch plate within said housing coaxial therewith and rotatable relative thereto, means for connecting a driving and a driven member with said housing and clutch plate respectively, a friction disc coaxial with said plate in frictional engagement with one side thereof and rotatable relative to said housing and said plate, a pad of radially expansible friction material between one end wall of said pair and said disc and in frictional engagement with said one end wall and with said disc and with the inner cylindrical surface of said housing, a friction disc between the other side of said plate and the opposite head of said housing, said pad being radially expansible into different degrees of frictional engagement with the said inner cylindrical surface of said housing upon axial movement of said one head toward said other head to effect different degrees of compression of said pad.

3. A clutch head comprising a hollow cylindrical housing, a clutch plate within said housing rotatable relative thereto and coaxial therewith, means for connecting a driving and a driven member with said housing and clutch plate respectively, a pad of resilient, radially expansible friction material between said clutch plate and one end of said housing in frictional engagement with the inner cylindrical surface of said housing, a friction disc between said clutch plate and said pad, means carried by said housing at the side of said plate opposite said disc and at the end of said housing opposite said pad supported for movement toward said one end of said housing to effect compression of said pad against said disc and radial expansion thereof into different degrees of frictional engagement with said inner surface of said housing, said plate being movable axially within said housing toward said pad and into engagement with said friction disc upon said movement of said means.

4. A clutch head comprising a hollow cylindrical housing, a pair of heads respectively closing opposite ends of said housing and secured to the latter, means for adjustably securing one head of said pair to said housing for movement thereof toward and away from the other head, a clutch plate within said housing coaxial therewith and rotatable relative thereto, separate means for connecting driving and driven members respectively to said housing and clutch plate, one of said means including an annular flange on one head of said pair spaced within said housing and coaxial therewith and the other of said means including a central hollow boss on said plate within said housing and coaxial with said flange, the external diameters of said flange and said boss being substantially the same, annular friction members rotatably supported on said flange and on said boss respectively at opposite sides of said plate and between said heads whereby movement of one of said heads toward the said other head will compress said friction members between said plate and said head.

5. A clutch head comprising a hollow cylindrical housing, a pair of heads respectively closing opposite ends of said housing and secured to the latter, means for adjustably securing one head of said pair to said housing for movement thereof toward and away from the other head, a clutch plate within said housing coaxial therewith and rotatable relative thereto, separate means for connecting driving and driven members respectively to said housing and clutch plate, one of said means including an annular flange on one head of said pair spaced within said housing and coaxial therewith and the other of said means including a central hollow boss on said plate within said housing and coaxial with said flange, the external diameters of said flange and said boss being substantially the same, annular friction members rotatably supported on said flange and on said boss respectively at opposite sides of said plate and between said heads whereby movement of one of said heads toward the said other head will compress said friction members between said plate and said head, said annular friction members being of plastic rubber like radially expansible material for expanding into frictional engagement with said flange, boss, and with the radially inwardly facing sides of said housing upon said compression thereof.

6. A clutch head comprising a hollow cylindrical housing, a pair of heads respectively closing opposite ends of said housing and secured to the latter, means for adjustably securing one head of said pair of said housing for movement thereof toward and away from the other head, a clutch plate within said housing coaxial therewith and rotatable relative thereto, separate means for connecting driving and driven members respectively to said housing and clutch plate, one of said means including an annular flange on one head of said pair spaced within said housing and coaxial therewith and the other of said means including a central hollow boss on said plate within said housing and coaxial with said flange, the external diameters of said flange and said boss being substantially the same, annular friction members rotatably supported on said flange and on said boss respectively at opposite sides of said plate and between said heads whereby movement of one of said heads toward the said other head will compress said friction members between said plate and said head, said annular friction members being arranged in coaxial pairs respectively at opposite sides of said plate, the said friction members that are adjacent said heads being of plastic radially expansible elastic material.

WALTER D. WHITNEY.

REFERENCES CITED

The following references are of record in the file of this patent:

UNITED STATES PATENTS

| Number | Name | Date |
|---|---|---|
| 1,346,245 | Palosky | July 13, 1920 |
| 1,425,305 | White | Aug. 8, 1922 |
| 1,896,506 | Barholomew | Feb. 7, 1933 |
| 1,949,520 | Whisler | Mar. 6, 1934 |
| 2,067,284 | Pearce | Jan. 12, 1937 |
| 2,323,355 | Ricciardi | July 6, 1943 |